United States Patent
Doll et al.

[19]

[11] Patent Number: 6,059,349
[45] Date of Patent: May 9, 2000

[54] TELESCOPING TRAILER COVER WITH IMPROVED DRIVE AND TRACKING SYSTEM

[75] Inventors: Jerry T Doll, La Crosse; Duane J. Thomas, West Salem, both of Wis.

[73] Assignee: River Steel, Inc., La Crosse, Wis.

[21] Appl. No.: 09/353,095

[22] Filed: Jul. 14, 1999

[51] Int. Cl.$^7$ ........................................................ B60P 7/02
[52] U.S. Cl. ........................ 296/100.03; 296/100.04; 296/100.05
[58] Field of Search ...................... 296/100.03, 100.04, 296/100.05

[56] References Cited

U.S. PATENT DOCUMENTS

| | | | |
|---|---|---|---|
| 2,074,358 | 1/1937 | Bixel et al. | 296/100.03 |
| 2,494,013 | 1/1950 | Tapp | 296/100.05 |
| 2,853,340 | 9/1958 | Hershberger | 296/100.04 |
| 3,910,629 | 10/1975 | Woodard | 296/100.05 |
| 5,203,603 | 4/1993 | Hertzberg et al. | 296/100.03 |
| 5,368,396 | 11/1994 | Cantrell | 296/100.05 |
| 5,516,182 | 5/1996 | Aragon et al. | 296/100.05 |

*Primary Examiner*—Gary C. Hoge
*Attorney, Agent, or Firm*—Quarles & Brady

[57] ABSTRACT

A telescoping trailer cover assembly has a stationary section (16) and three movable sections (17, 18, 19) coupled in series. The three movable sections (17, 18, 19) are supported on wheels (38) having V-shaped grooves (39) for running along respective tracks (31, 32, 33) having a projecting V-profile. Cam rollers (41) are mounted near the wheels (38) and are positioned to run underneath the tracks (31, 32, 33). A drive system includes a pair of endless loop drive chains (66, 70), which are connected to the rearmost section (19) of the cover assembly (10), with each chain (66, 70) running longitudinally down a respective side of trailer (11). The chains (66, 70) are driven through sprockets (67) mounted on a common drive shaft (55), which in turn is driven by a pneumatic motor (50) through a gear reduction box (51), and a further gear reduction is provided by a pair of drive sprockets (52, 54). The motor (50) operates in one direction to collapse the sections in telescoping fashion and open the cover assembly (10), or in an opposite direction to extend the sections and close the cover assembly (10).

13 Claims, 6 Drawing Sheets

TELESCOPING TRAILER COVER WITH IMPROVED DRIVE AND TRACKING SYSTEM

TECHNICAL FIELD

The invention relates to vehicle trailers with retractable enclosures for protection of goods from the environment.

DESCRIPTION OF THE BACKGROUND ART

In the steel industry, large coils of steel sheet stock are transported within industrial areas for delivery to factories for manufacturing automobiles and appliances. It is important that the steel or other goods be protected from the environment, so as to prevent corrosion that would interfere with painting and finishing operations during manufacture of automobiles and appliances.

The size of the goods is large, and it is therefore necessary that a large cover be fabricated to totally enclose the goods being transported. Due to the size of the cover, a motor and a drive system is necessary to drive the cover sections between an open and a closed position.

A prior art system used a stationary cover section and two movable cover sections to form a telescoping cover assembly. Due to the size and weight of the cover sections, a problem has developed in that the cover sections may be derailed from the tracks on which they run.

It is also desired to provide for smoother opening and closing of the cover and for greater power and balance in the drive system. In prior systems, a drive chain extended down only one side of the trailer bed. The cover sections tended to be pulled ahead on one side compared to the other which made for less than a smooth linear movement of the telescoping cover sections.

SUMMARY OF THE INVENTION

The invention is incorporated in a telescoping trailer cover assembly with sections coupled in series. The movable sections are supported on wheels for rolling movement along respective tracks. The drive system includes a pair of endless loops which are connected to the rearmost section of the cover, with each loop running longitudinally down a respective side of trailer. The drive loops are driven through sprockets mounted on a drive shaft, which in turn is driven by a motor. The motor operates in one direction to collapse the sections and open the cover, or in an opposite direction to extend the sections and close the cover.

More particularly, the tracks are formed by angle members providing an inverted V-profile in cross section. The wheels carrying the movable sections have V-shaped grooves which receive the tracks. These tracks replace round bars used in prior tracking systems for the telescoping covers.

Traveling cam rollers are mounted near the wheels and are positioned to run underneath the tracks. This provides a smooth rolling operation, while tending to hold the rolling cover sections on their respective tracks and prevent derailment.

The motor is coupled to the two endless drive loops through a common drive shaft, which extends transversely across a front end portion of the trailer. This provides a balanced force for pulling the movable sections to either a closed or open position.

The assembly has been further improved by using a gear reduction mechanism to couple the motor to the drive shaft. This allows the use of a more powerful motor. The motor is also advantageously located inside the cover to protect it from the environment.

Other objects and advantages of the invention, besides those discussed above, will be apparent to those of ordinary skill in the art from the description of the preferred embodiments which follow. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

DETAILED DESCRIPTION OF THE PREFERRED EMBODIMENTS

Figure 1:
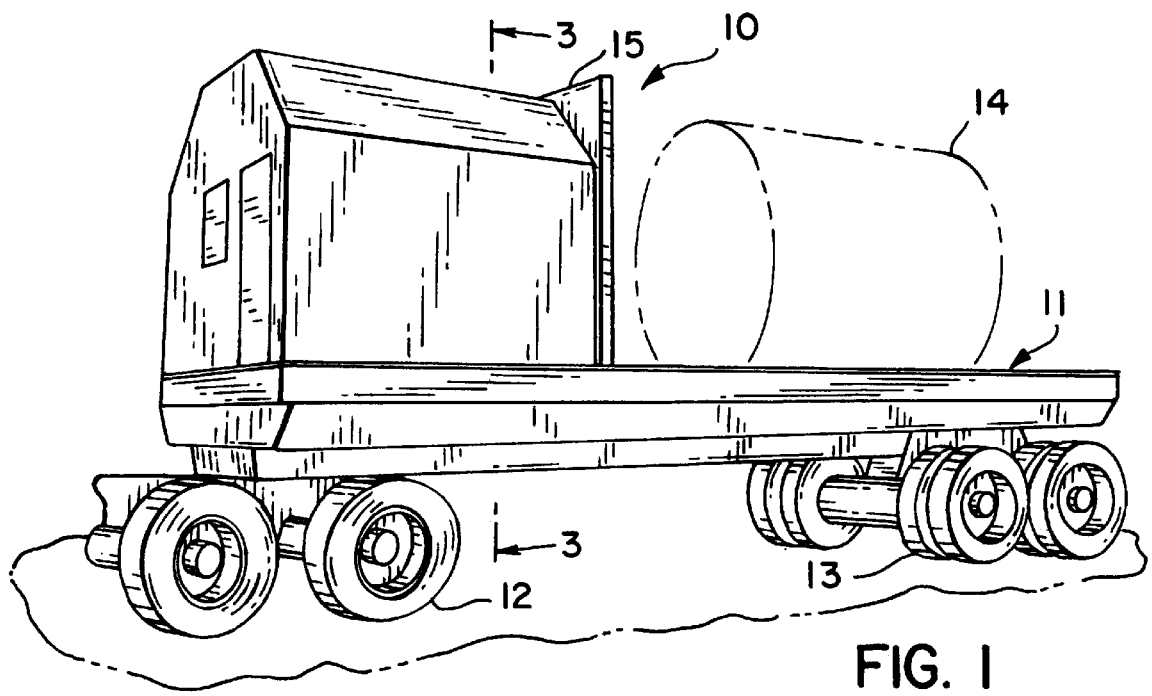
FIG. 1 is a perspective view of the telescoping trailer cover assembly of the present invention in a collapsed or open position.

Referring to FIG. 1, a vehicle trailer 11 is provided for carrying the assembly 10 of the present invention. In operation, the trailer 11 is hitched to a vehicle tractor (not shown). The trailer 11 is mounted on four axles, a tandem pair in front with double tires 12 (only one tire in each pair being shown) and a tandem pair of axles in back with double tires 13. As seen in FIG. 1, the assembly 10 is shown in an open position with telescoping sections 16–19 in a collapsed position. A coil 14 of steel sheet stock, which is not a part of the assembly 10, is represented in phantom. A large stop plate (not shown) is provided inside the cover assembly 10 on the trailer bed to separate the cargo area where the coils are carried from a forward end of the trailer in which certain equipment is located, as described below. A door frame 15 is provided at the rear assembly 10 to support a flexible sheet (not shown) which is used to close the rear entrance.

Figure 2:
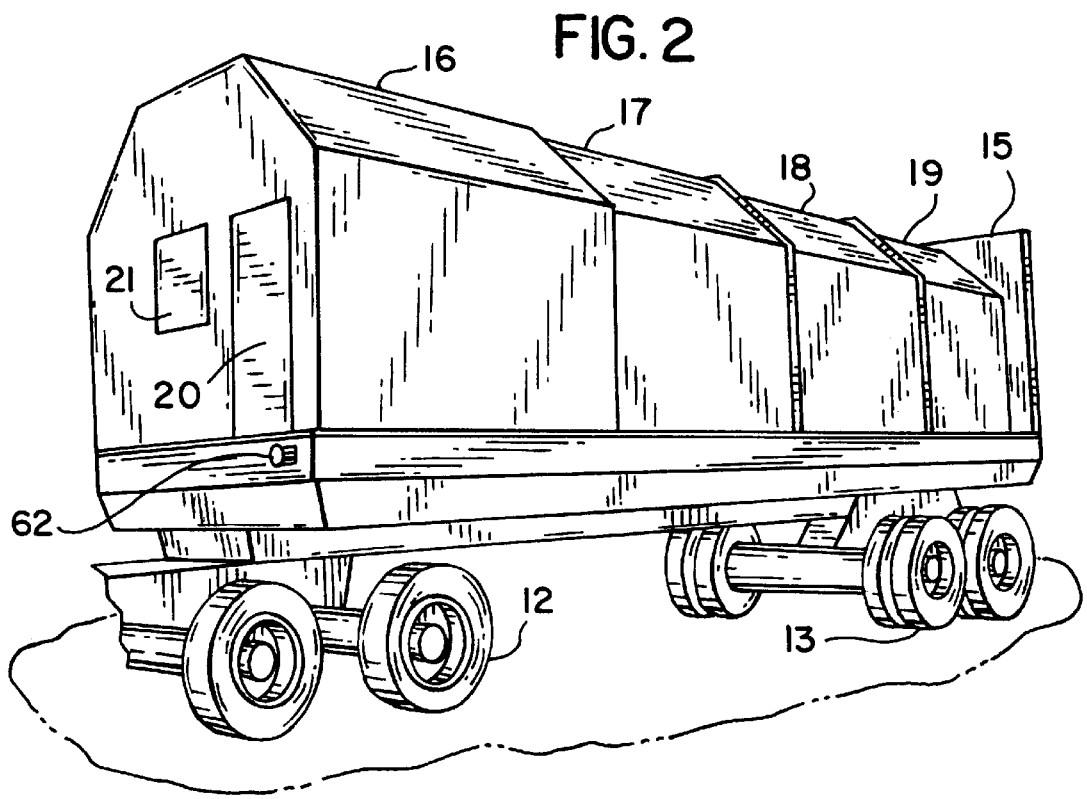
FIG. 2 is a perspective view of the telescoping trailer cover assembly of the present invention in an extended or closed position.

As seen in FIG. 2, the assembly 10 is shown in a closed position with telescoping sections 16–19 in an extended position. The assembly 10 includes a first or front section 16, which in this embodiment is stationary or fixed on the trailer bed. Behind the front, stationary section 16 are second, third and fourth sections 17, 18 and 19, which are coupled together and which move from the rear into the next section to provide a telescoping group of cover sections 16–19. A door 20 and a window 21 are provided in a wall of the front section that faces forward towards the vehicle cab.

Figure 3:
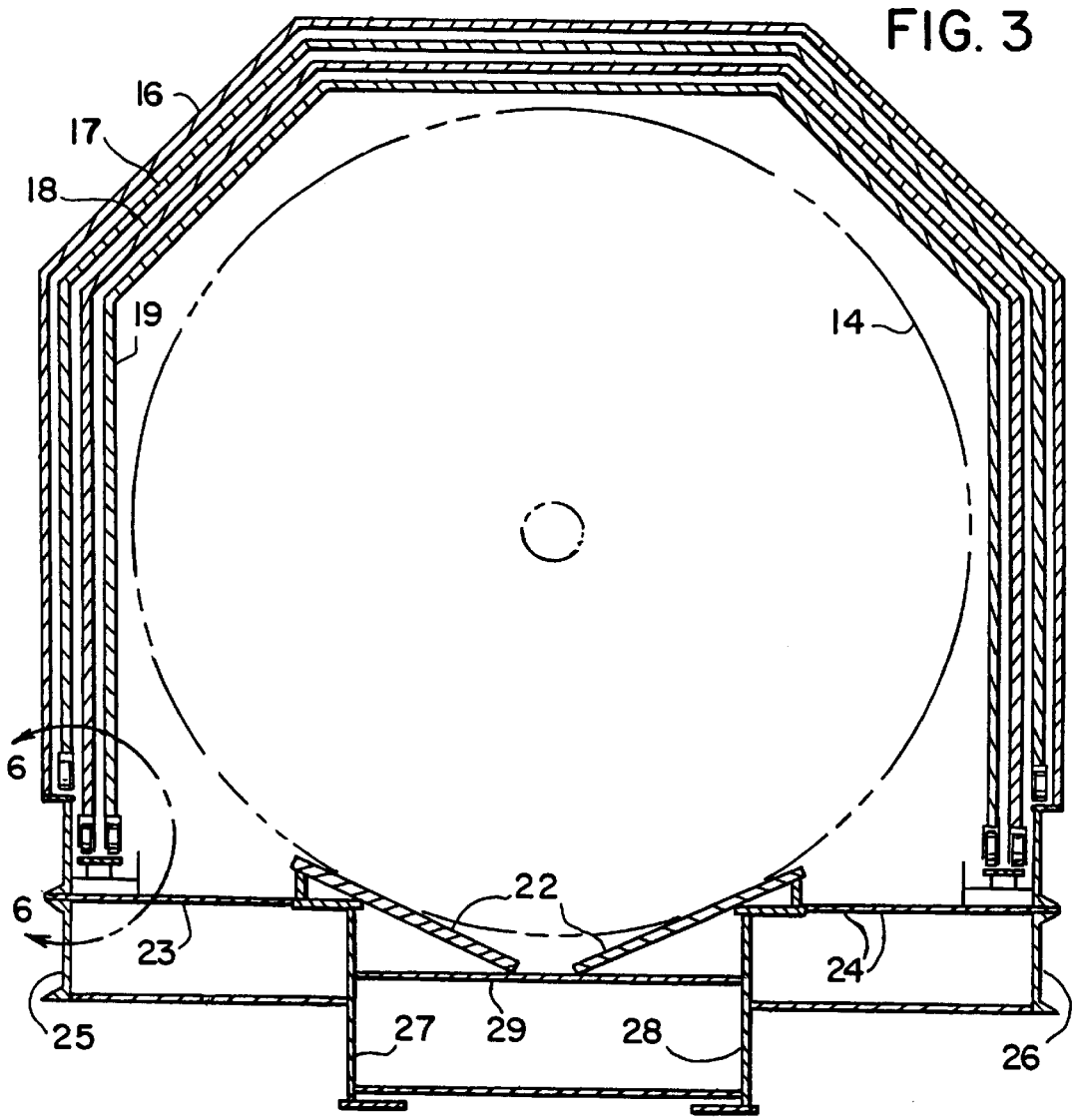
FIG. 3 is a sectional view in elevation taken from the rear of the cover assembly in the plane indicated by line 3—3 in FIG. 1.

Referring next to FIG. 3, with the sections 16–19 in their collapsed, open position, it can be seen that the coils 14 are seated on opposing ramps 22 angled down towards the longitudinal center axis of the trailer 11. The trailer 11 is formed of steel beams 23, 24 joined at opposite ends to respective channel members 25, 26. In the center section, there are several depending vertical members 27, 28, joined by another steel beam 29, which forms a supporting structure for the ramps 22.

Figure 6:
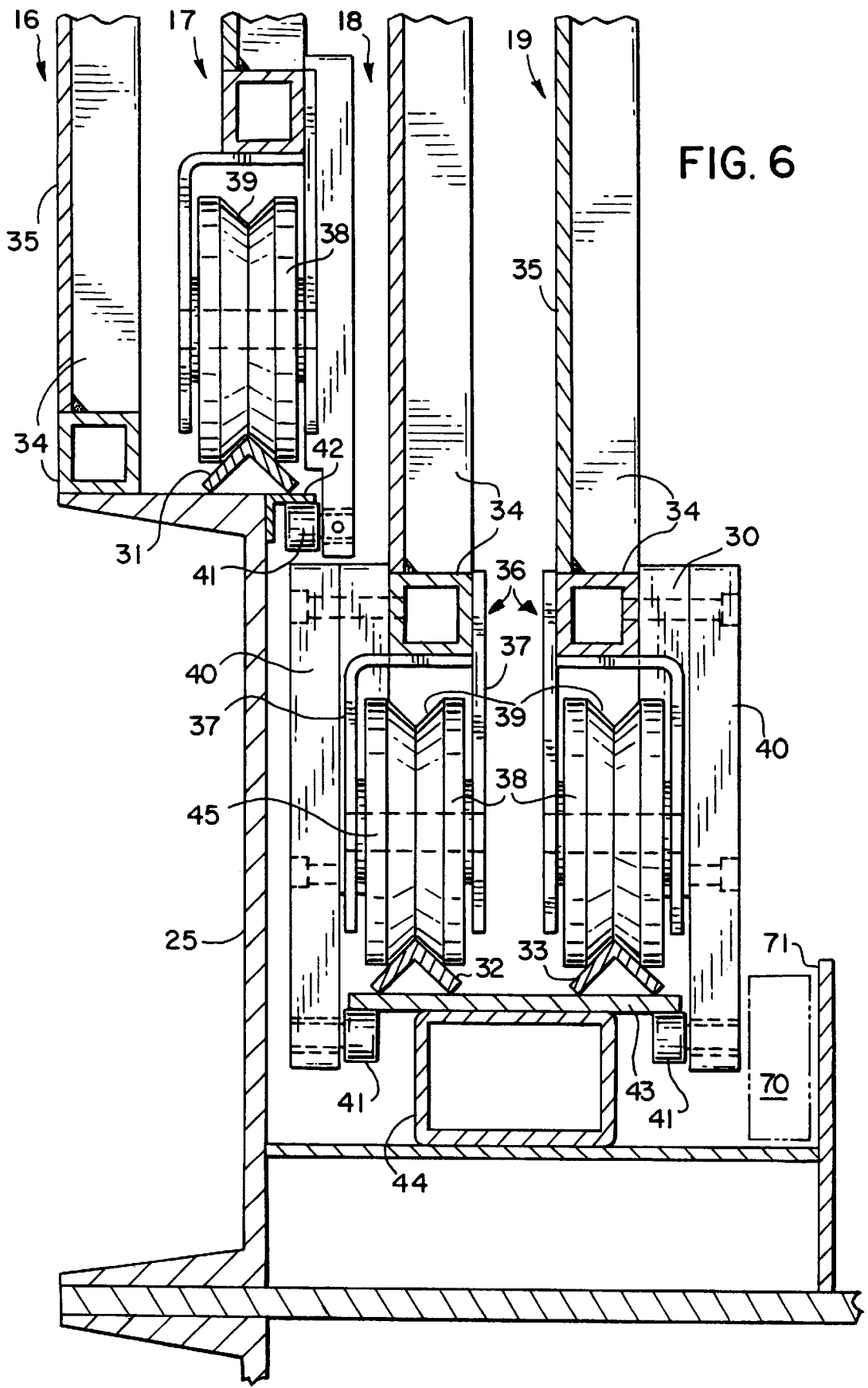
FIG. 6 is an enlarged detail view taken in the area defined by line 6—6 in FIG. 3.

As seen in FIGS. 3 and 6, the second section 17 travels on tracks 31 on opposite longitudinal sides of the trailer 11 (left and right when viewed from the rear). These tracks 31 are elevated from pairs of tracks 32, 33 for the third section 18 and the fourth section 19, respectively.

As seen best in FIG. 6, each cover section 16–19 is formed of tubular steel members 34 and flat sheet metal members 35. The first or front section 16 is fixed on top of a longitudinally extending, outwardly opening, channel beam 25. Wheel assemblies 36 are mounted to bottom longitudinal tubular members 34 and provide spaced apart wheel plates 37, for supporting an axle 45 and a needle bearing (not shown) on which the wheel 38 is supported and rotates.

Still referring to FIG. 6, each of the movable cover sections 17, 18, 19 is supported on four such wheel assemblies 36, located approximately at the four bottom corners of each cover section 17, 18, 19. The wheels 38 are made of metal and have a V-shaped groove 39 around their rolling circumference. The wheels 38 ride on the tracks 31, 32, 33, which are provided by angle members. The angle members 31, 32, 33 are inverted in position to provide a projecting V-profile which complements the V-shaped groove 39 in the wheels 38. Bars 40 and shims 30 are fastened by bolting or riveting to the tubular members 34. The bars 40 extend downward past the tracks 31, 32, 33, where cam rollers 41 are mounted to run on surfaces underneath the tracks 31, 32, 33. In the case of the uppermost track 31 for the second section 17, an angle member 42 is mounted to a large structural channel member 25 to support the track, and this angle member 42 provides the running surface for the cam roller 41. The other two tracks 32, 33 are supported on a plate 43, which is supported on a longitudinally extending hollow tubular member 44. The extensions of the plate 43 over the hollow tubular member 44 provide running surfaces for the cam rollers 41.

This arrangement provides a tracking system in which the wheels 38 having the V-shaped grooves 39 are held on the complementary shaped tracks 31, 32, 33. The traveling cam rollers 41 provide a smooth rolling operation, while tending to hold the heavy cover sections 17, 18 and 19 on their respective tracks 31, 32, 33 and prevent derailment.

Figure 5:
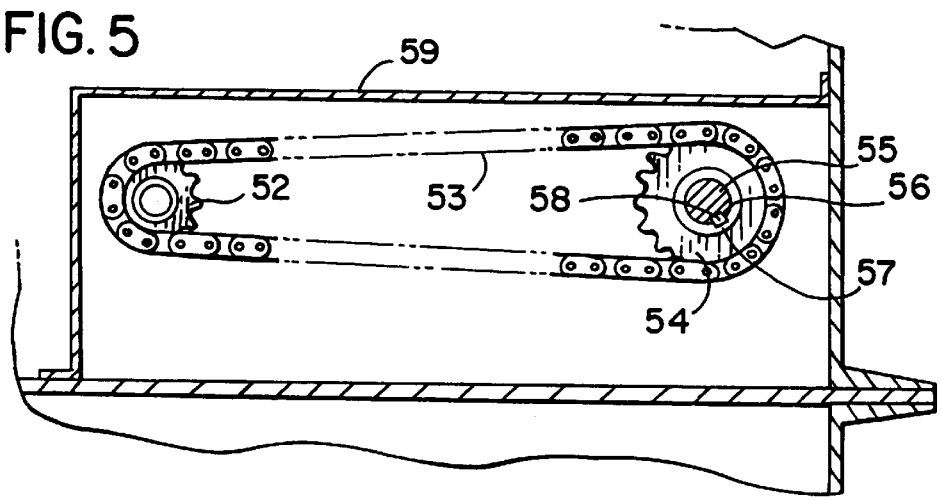
FIG. 5 is a detail sectional view taken in the plane indicated by line 5—5 in FIG. 4.
Figure 4:
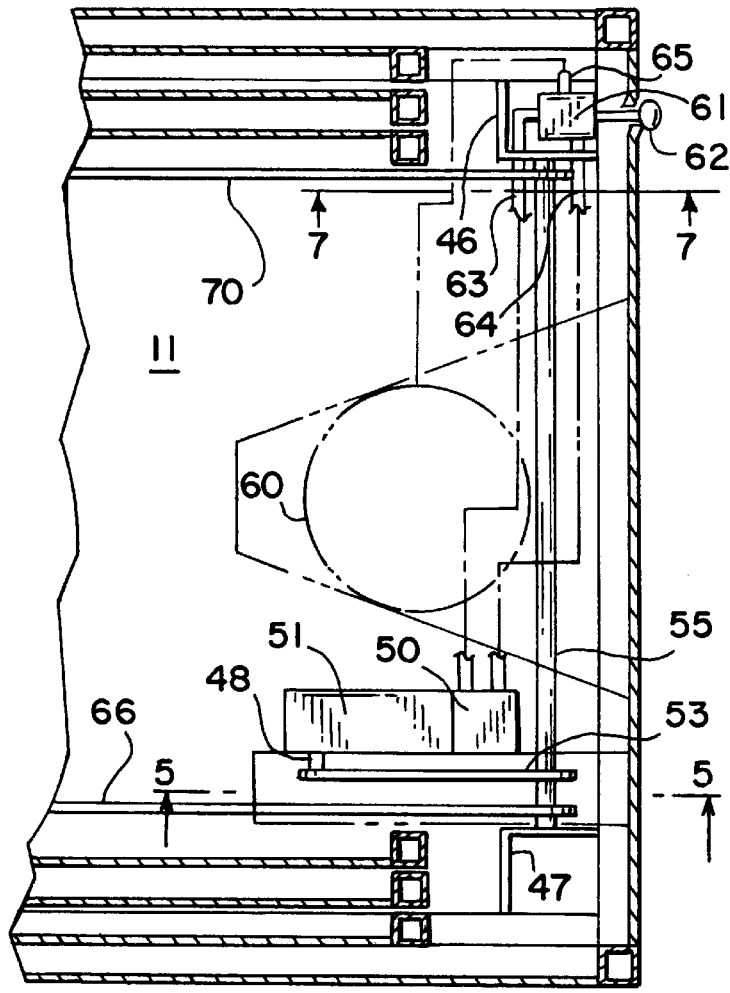
FIG. 4 is a top plan view of a forward portion of a trailer bed in the telescoping trailer cover assembly of the present invention with the cover sections shown in section.

Referring next to FIGS. 4 and 5, the movement of the cover sections 17, 18, 19 along the tracks 31, 32, 33 is provided by a drive system including a pneumatic motor 50, connected through a 20:1 gear reduction box 51 to a sprocket 52 (FIG. 5) and to a short, endless loop, drive chain 53 seen in FIGS. 4 and 5. The short drive chain 53 connects to a sprocket 54 (FIG. 5) mounted on a transverse drive shaft 55, referred to in the technological field as a "jack shaft." This shaft 55 is supported in frame members 46, 47, located in opposite front corners of trailer 11 (FIG. 4). Referring to FIG. 5, the sprocket 54 on the transverse drive shaft 55 is larger in diameter and is provided with twice the number of teeth of sprocket 52 on the motor output shaft 48 to accomplish a further 2:1 gear reduction. This provides a total gear reduction of 40:1 between the motor 50 and the drive shaft 55. The jack shaft 55 is cylindrical except for a quarter-inch deep key cut 56 (FIGS. 5 and 7), and the sprocket 54 on the drive shaft 55 has a collar 57 with a key member 58 which is keyed into this keyed groove 56 on the shaft 55 for a non-slip connection. A chain guard 59 (FIG. 5) is provided over the top of drive chain 53.

Referring again to FIG. 4, pressurized air is drawn from a source on the truck tractor (not shown) and accumulated in a holding tank 60 located in the forward section of the trailer 11. Air is supplied to the motor 50 through a two-way valve 61, which is seen in the upper right corner in FIG. 4. The valve is connected through two hoses 63, 64 to the motor 60, and is connected through a third hose 65 to the holding tank 60. In this embodiment, the valve 61 is manually operated by a valve handle 62 extending out the front end of the trailer (FIG. 2). In other embodiments, a valve may be utilized which is actuated through electrical, hydraulic or pneumatic control from the vehicle tractor cab. In the present embodiment the valve handle 62 has two positions (open and close). Depending on which position it is in, air flow is reversed through the motor 50 so that there is both a forward and reverse drive direction.

Figure 7:
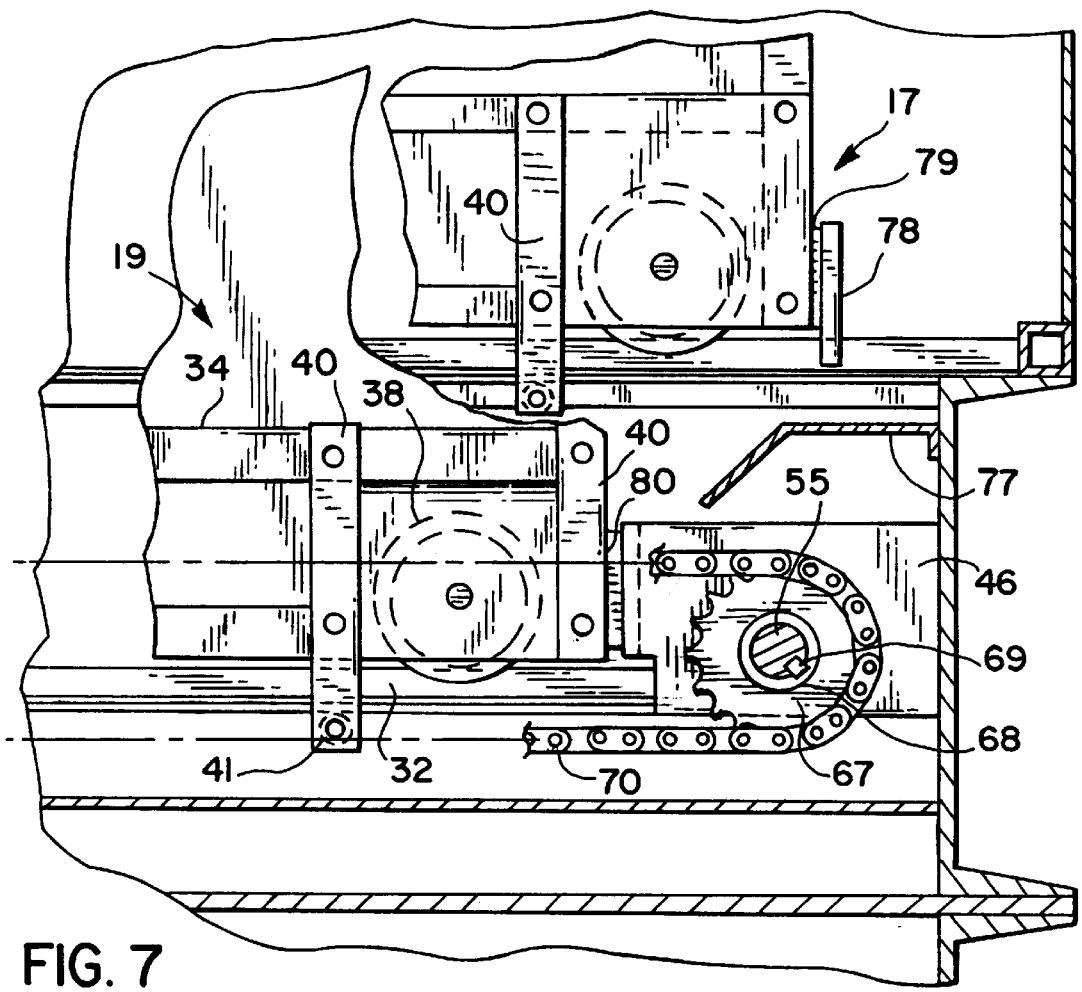
FIG. 7 is a left side view in elevation taken in the plane indicated by line 7—7 in FIG. 4.

Referring next to FIGS. 4 and 7, the shaft 55 is connected to two sprockets disposed on opposite sides of the trailer 11. The sprockets, in turn, connect to long endless loop drive chains 66, 70 extending from the front of the trailer to the back along right and left sides, respectively. Although chains are shown in the preferred embodiment, other embodiments could use belts or members other than chains. A sprocket 67 for the left chain drive 70 is seen in FIG. 7. The sprocket for the right chain 66 is not seen in detail. Normally, chain guards are positioned above the sprockets 67, one of these guards 77 being seen in FIG. 7.

Figure 11:
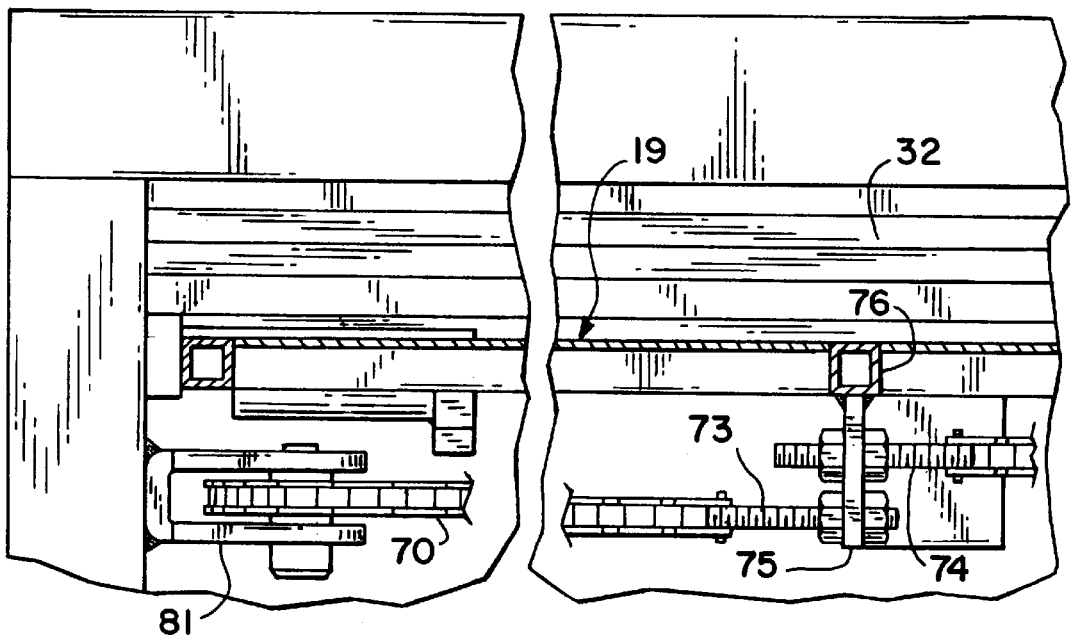
FIG. 11 is a fragmentary top plan view of the i apparatus seen in FIGS. 9 and 10.
Figure 9:
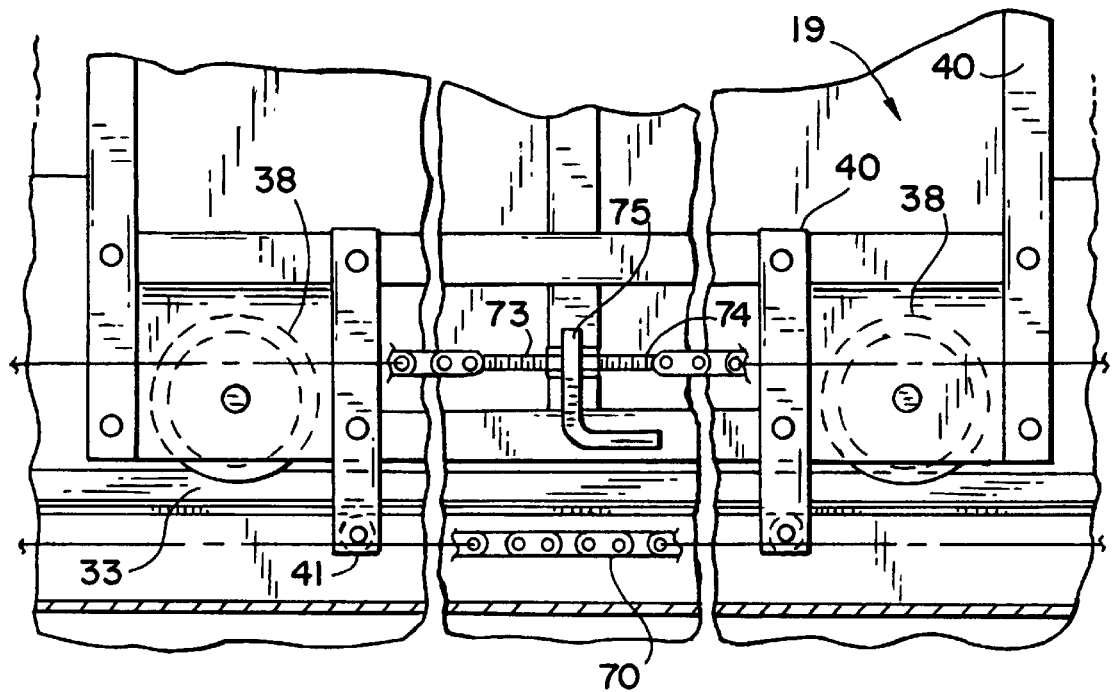
FIG. 9 is a fragmentary side view of a lower left front inside portion of the cover assembly of FIG. 3.
Figure 10:
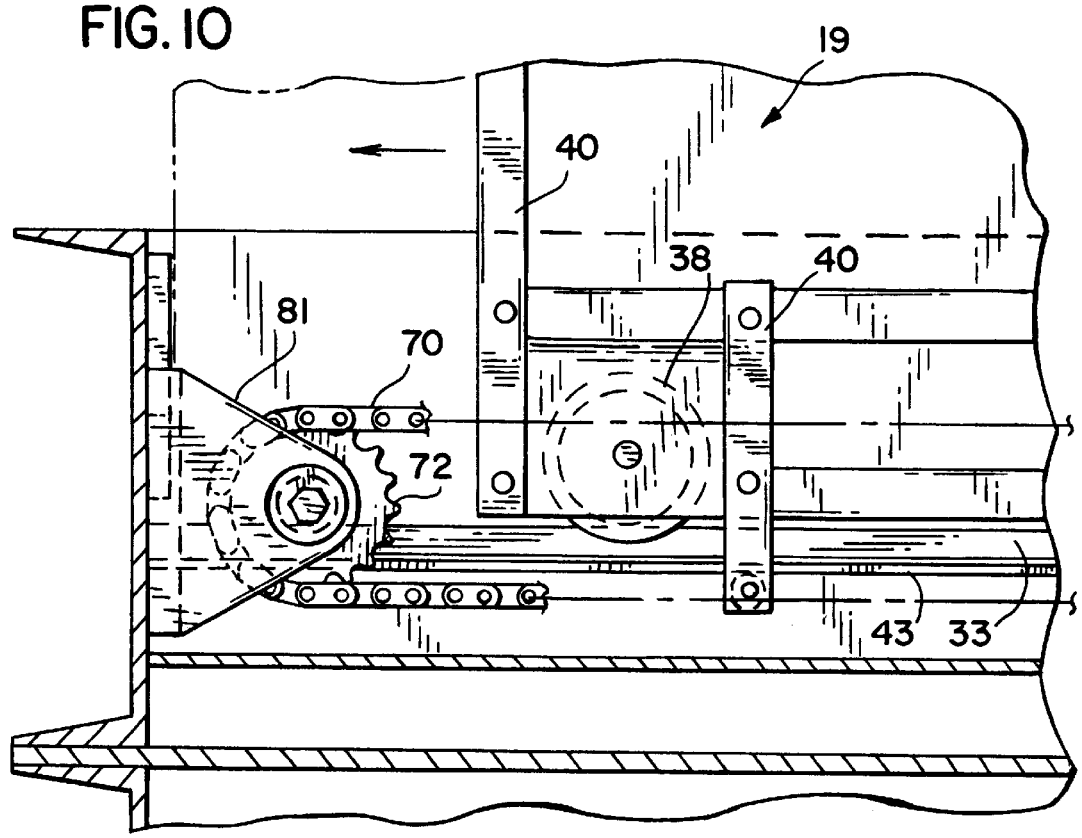
FIG. 10 is a detail side view in elevation of a lower left rear inside portion of the cover assembly of FIG. 9.

The sprocket 67 has a collar 68 with a key member 69 which is keyed into this keyed groove 56 on the shaft 55 for a non-slip connection. The chain 70 is formed in an endless loop around the sprocket 66 and travels in a channel 71 (FIG. 6). The chain 70 loops around an idler sprocket 72 mounted on a bracket 81 (FIG. 10) at the back end of the rearmost cover section 19. A chain guard is not shown for a better view of the idler sprocket 72. The endless loop in the chain 70 is closed, as seen in FIGS. 9 and 11, with a pair of threaded adjustment bolts 73, 74 which are anchored in a flange 75 which is connected to a tubular member 76 which separates the rear one-third section of the rearmost cover section 19 from the front two-thirds section of rearmost cover section 19. There is a second endless loop drive chain 66 running down the right hand side of the trailer 11 as seen in FIGS. 4 and 6, and it also connects to an idler mounted on the rearmost cover section 19. This dual chain drive provides for balanced forces in pulling the doors in either direction.

Figure 8:
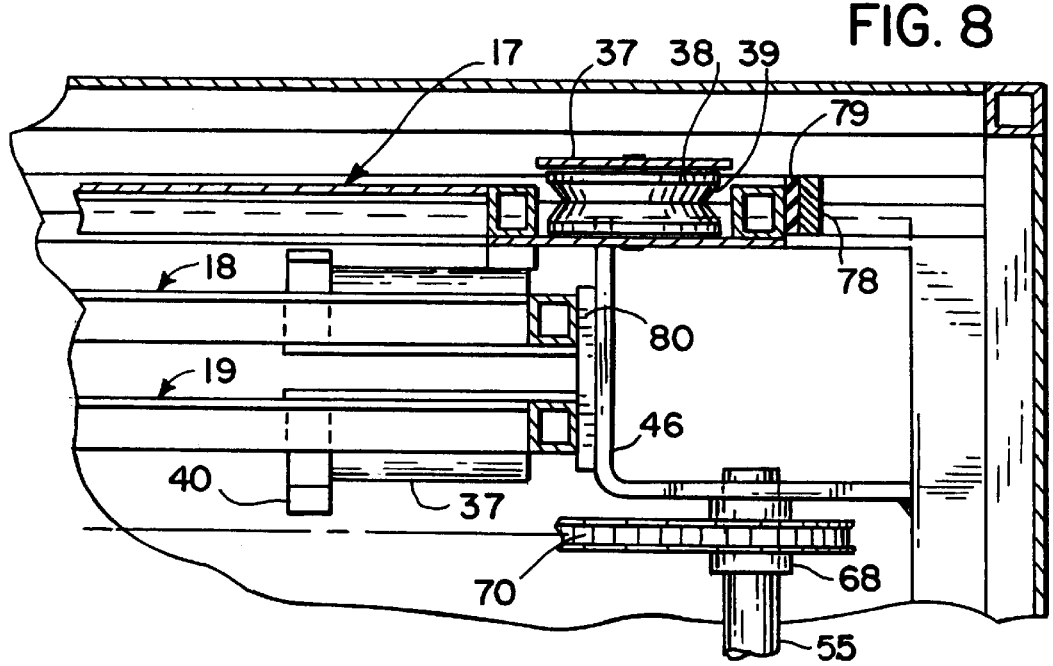
FIG. 8 is an enlarged detail view of the upper right hand corner of FIG. 4.

Referring to FIG. 8, when the cover sections are in their collapsed or open position, the movement of the second section is limited by a stop formed by stop member 78 and a pad 79 of resilient material. Another pad 80 of resilient material is attached to frame 46 to form a bumper for stopping movement of the third and fourth sections 18, 19.

The cover sections 16, 17, 18 and 19 are coupled together and prevented from coming apart by overlapping flanges. To assist the smooth operation of the cover sections cam rollers (not shown) are mounted inside the sections to run on the next inner section. The cam rollers are supported on flanges which, in turn, are supported on wider flange plates which are bolted to the smaller square tubular frame members. This provides an overlap of edges between the moving sections so that the sections could not move past each other at the limit of their extension. This structure and operation is described and illustrated in more detail in a copending U.S. Pat. Application of Doll, filed on even date herewith and entitled "Camming Arrangement for A Telescoping Trailer Cover," the disclosure of which is hereby incorporated by reference.

It can be seen from the above description that an improved tracking and drive system has been provided. The cover sections 17–19 are held on the tracks 31, 32 and 33 and are pulled by balanced forces, using the dual chain drive and a stronger motor.

This has been a description of the preferred embodiments of the method and apparatus of the present invention. Those of ordinary skill in this art will recognize that modifications might be made while still coming within the spirit and scope of the invention and, therefore, to define the embodiments of the invention, the following claims are made.

What is claimed is:

1. A telescoping cover assembly for a vehicle trailer, comprising:
    a plurality of movable sections coupled in series and supported for rolling movement along respective pairs of tracks;
    at least two endless drive loops which are connected to move a rearmost one of the movable sections of the cover assembly, with each drive loop running longitudinally along a respective side of the vehicle trailer;
    a drive system coupled to both endless drive loops to provide balanced driving forces as the movable sections are collapsed in telescoping fashion to open the cover assembly, and as the movable sections are extended to close the cover assembly;
    wherein the tracks are formed by angle members providing an inverted V-profile in cross section; and wherein the wheels carrying the movable, telescoping sections have V-shaped grooves which receive the tracks.

2. The assembly of claim 1, further comprising cam rollers coupled to the wheels and positioned to run underneath the tracks to hold the wheels on their respective tracks.

3. A telescoping cover assembly for a vehicle trailer, comprising:
    a plurality of movable sections coupled in series and supported for rolling movement along respective pairs of tracks;
    at least two endless drive loops which are connected to move a rearmost one of the movable sections of the cover assembly, with each drive loop running longitudinally along a respective side of the vehicle trailer;
    a drive system coupled to both endless drive loops to provide balanced driving forces as the movable sections are collapsed in telescoping fashion to open the cover assembly, and as the movable sections are extended to close the cover assembly; and
    wherein the drive system includes a motor which is coupled to the two endless drive loops through a common drive shaft extending transversely across a front end portion of the trailer.

4. The assembly of claim 3, wherein the drive shaft has a key for a non-slip connection with sprockets for driving the endless loops.

5. The assembly of claim 3, wherein the endless loops further comprise drive chains.

6. The assembly of claim 3, wherein the motor is disposed inside one of the movable sections to protect the motor from the environment.

7. The assembly of claim 3, wherein the motor is a pneumatic motor.

8. The assembly of claim 3, wherein the motor is coupled to the drive shaft through a gear reduction mechanism.

9. The assembly of claim 8, wherein the motor is coupled to the drive shaft through a gear reduction ratio of 40:1.

10. A telescoping cover assembly for a vehicle trailer, comprising:
    a plurality of movable sections coupled in series and supported on wheels for rolling movement along respective tracks;
    a drive system coupled to drive the assembly as the sections are collapsed in telescoping fashion to open the cover assembly, and as the movable sections are extended to close the cover assembly; and
    wherein the tracks are formed by angle members providing an inverted V-profile in cross section; and wherein the wheels carrying the movable sections have V-shaped grooves which receive the tracks.

11. The assembly of claim 10, further comprising cam rollers mounted near the wheels and positioned to run underneath the tracks to hold the wheels on their respective tracks.

12. A telescoping cover assembly for a vehicle trailer, comprising:
    a plurality of movable sections coupled in series and supported on wheels for rolling movement along respective tracks;
    a drive system including two endless drive loops coupled to drive the assembly as the movable sections are collapsed in telescoping fashion to open the cover assembly, and as the movable sections are extended to close the cover assembly; and
    wherein the drive system includes a motor which is coupled to the two endless drive loops through a common drive shaft extending transversely across a front end portion of the trailer.

13. The assembly of claim 12, further comprising
    cam rollers mounted near the wheels and positioned to run underneath the tracks to hold the wheels on their respective tracks; and
    wherein the tracks are formed by angle members providing an inverted V-profile in cross section; and wherein the wheels carrying the movable sections have V-shaped grooves which receive the tracks.

* * * * *